（12） United States Patent
Yaguchi et al.

(10) Patent No.: US 12,535,402 B2
(45) Date of Patent: Jan. 27, 2026

(54) METHOD OF REDUCING EFFECT OF STRAY LIGHT IN OPTICAL SENSOR

(71) Applicant: CANON KABUSHIKI KAISHA, Tokyo (JP)

(72) Inventors: Kazutaka Yaguchi, Shizuoka (JP); Takuya Mukaibara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 18/301,338

(22) Filed: Apr. 17, 2023

(65) Prior Publication Data

US 2023/0341316 A1 Oct. 26, 2023

(30) Foreign Application Priority Data

Apr. 21, 2022 (JP) .................. 2022-070267

(51) Int. Cl.
| | | |
|---|---|---|
| G01N 21/01 | (2006.01) | |
| B65H 5/00 | (2006.01) | |
| G01N 21/86 | (2006.01) | |
| G01N 21/88 | (2006.01) | |
| G03G 15/00 | (2006.01) | |

(52) U.S. Cl.
CPC .............. *G01N 21/01* (2013.01); *B65H 5/00* (2013.01); *G01N 21/86* (2013.01); *G01N 21/8806* (2013.01); *G03G 15/5029* (2013.01); *B65H 2553/414* (2013.01); *G01N 2021/8609* (2013.01); *G01N 2201/064* (2013.01); *G03G 2215/00616* (2013.01)

(58) Field of Classification Search
None
See application file for complete search history.

(56) References Cited

U.S. PATENT DOCUMENTS

| | | | |
|---|---|---|---|
| 7,491,923 B2* | 2/2009 | Tani | H10F 39/8063 |
| | | | 257/432 |
| 2003/0025090 A1* | 2/2003 | Iwasaki | B65H 7/14 |
| | | | 250/559.12 |
| 2013/0070484 A1 | 3/2013 | Mukaibara | |
| 2013/0164007 A1* | 6/2013 | Yanata | G03G 15/50 |
| | | | 399/49 |
| 2018/0292776 A1* | 10/2018 | Ino | G03G 15/5058 |
| 2021/0255102 A1 | 8/2021 | Ino | |

FOREIGN PATENT DOCUMENTS

| | | |
|---|---|---|
| JP | H11-354832 A | 12/1999 |
| JP | 2006-267644 A | 10/2006 |
| JP | 2019-197072 A | 11/2019 |

\* cited by examiner

*Primary Examiner* — Dominic J Bologna
(74) *Attorney, Agent, or Firm* — Venable LLP

(57) ABSTRACT

An optical sensor includes a light emitting unit configured to emit and output light, a light receiving unit configured to receive light, a substrate on which the light emitting unit and the light receiving unit are mounted, an electrically conductive pattern including a land to be electrically connected to an electrode of the light emitting unit, a resist arranged as a layer above the electrically conductive pattern or the substrate, a light shielding layer provided as a layer above the resist, and a light shielding region formed by a portion of the land and a portion of the light shielding layer overlapping in the direction of the normal of a mounting surface of the substrate, to shield stray light directed towards the substrate from the light emitting unit.

18 Claims, 12 Drawing Sheets

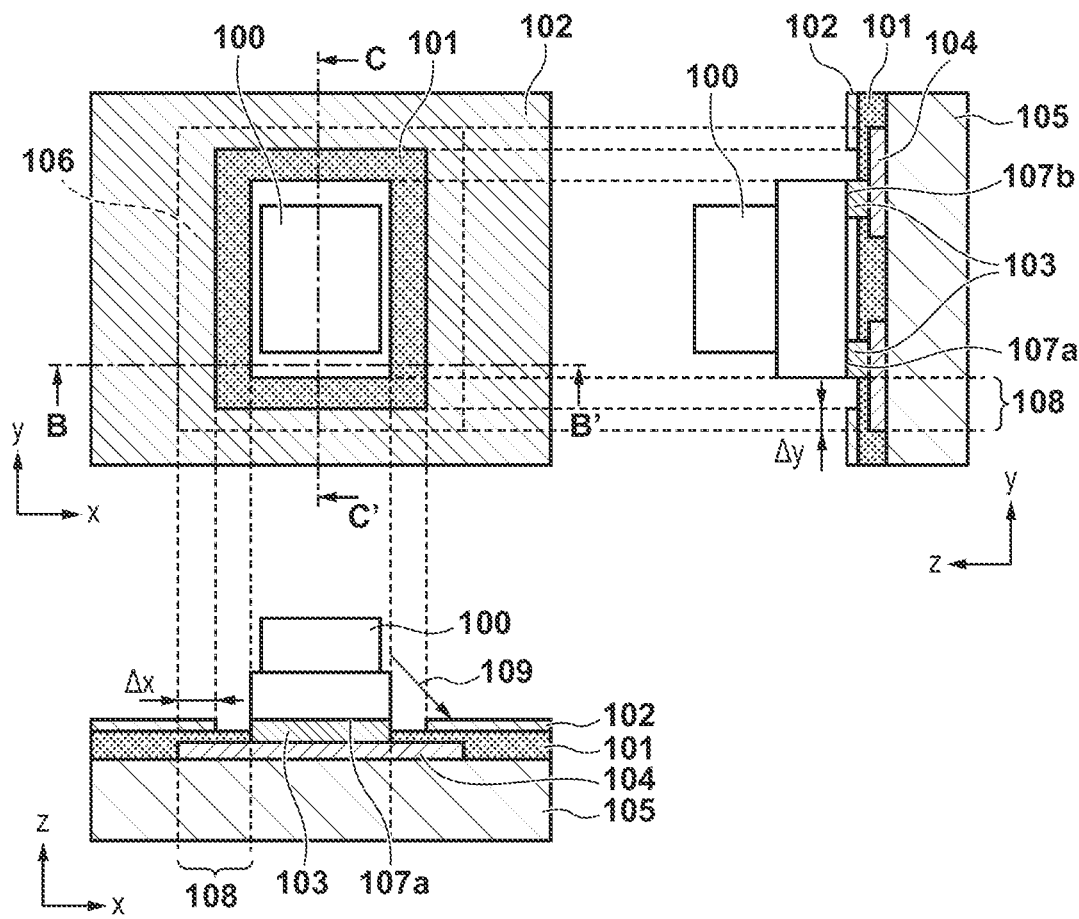

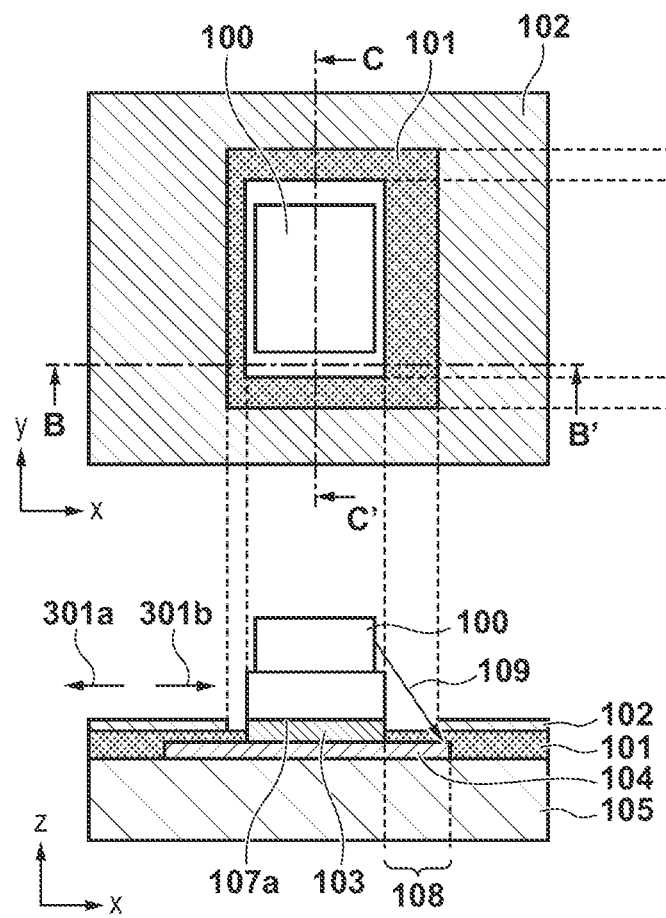
FIG. 3A
FIG. 3B
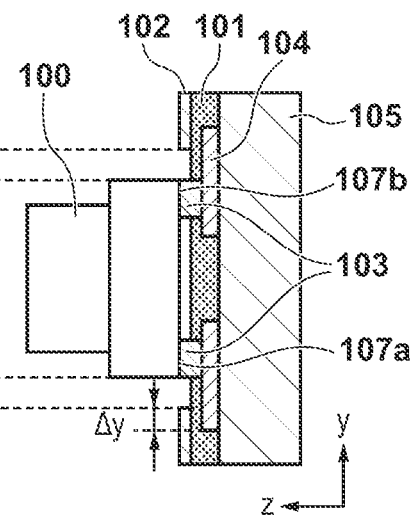
FIG. 3C

FIG. 5A
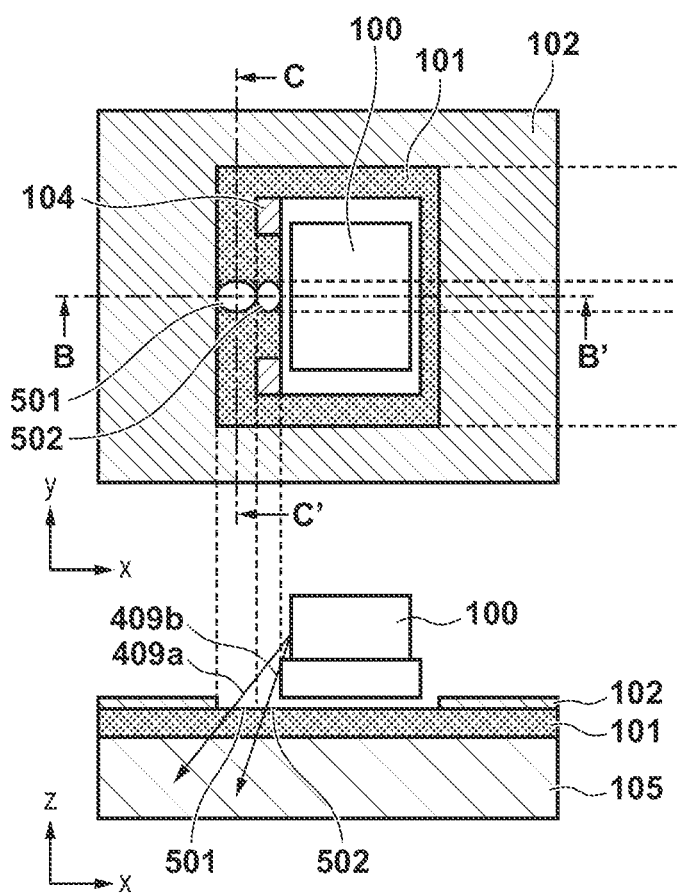
FIG. 5B
FIG. 5C
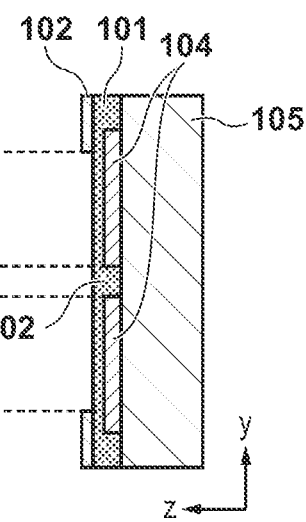

FIG. 6A
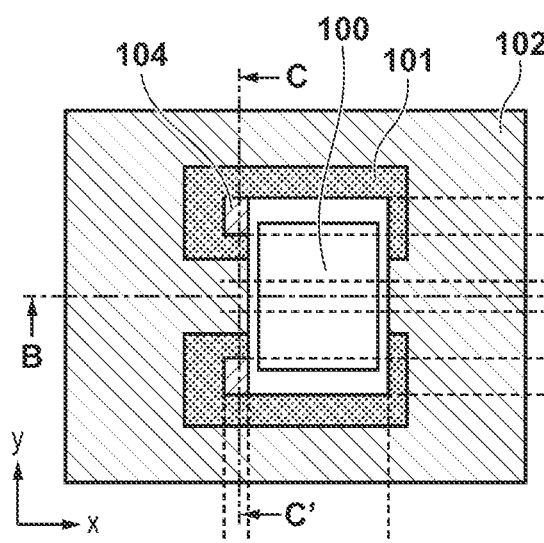
FIG. 6C
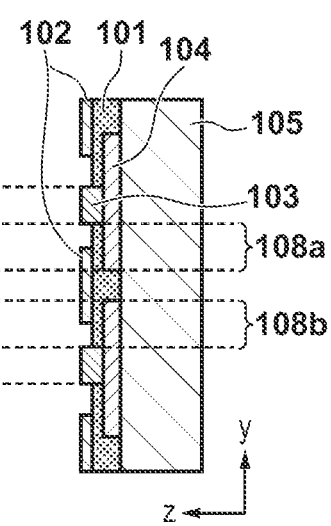
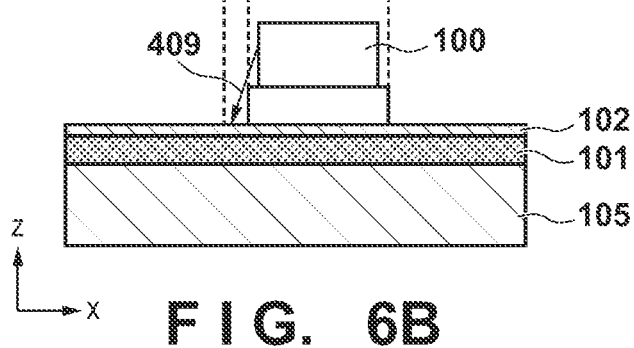
FIG. 6B

FIG. 8A
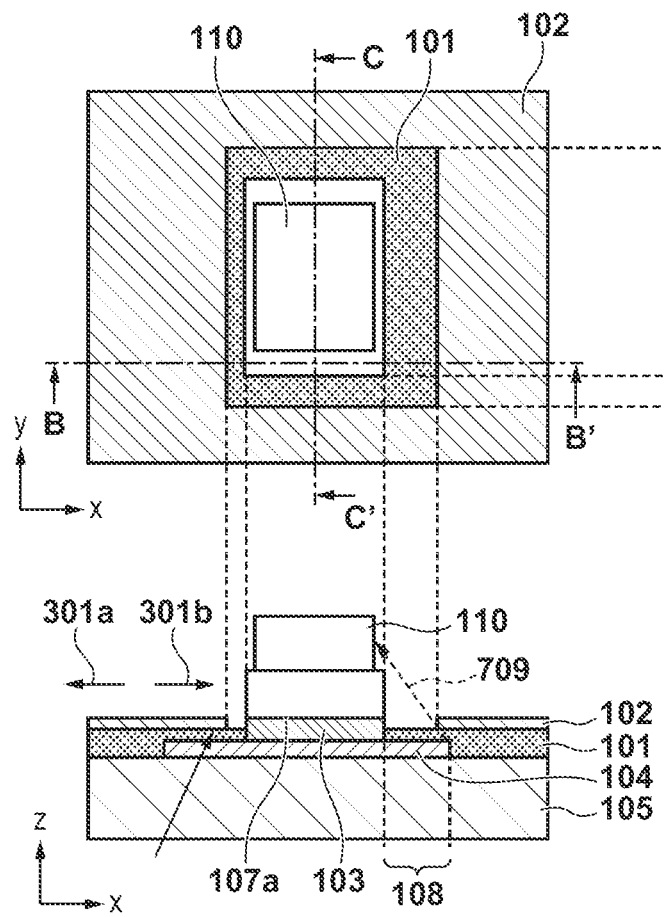
FIG. 8B
FIG. 8C
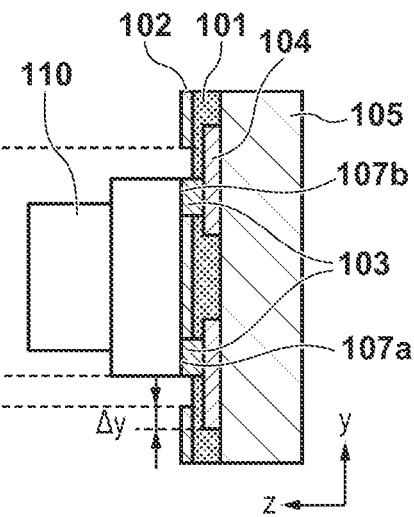

FIG. 9A
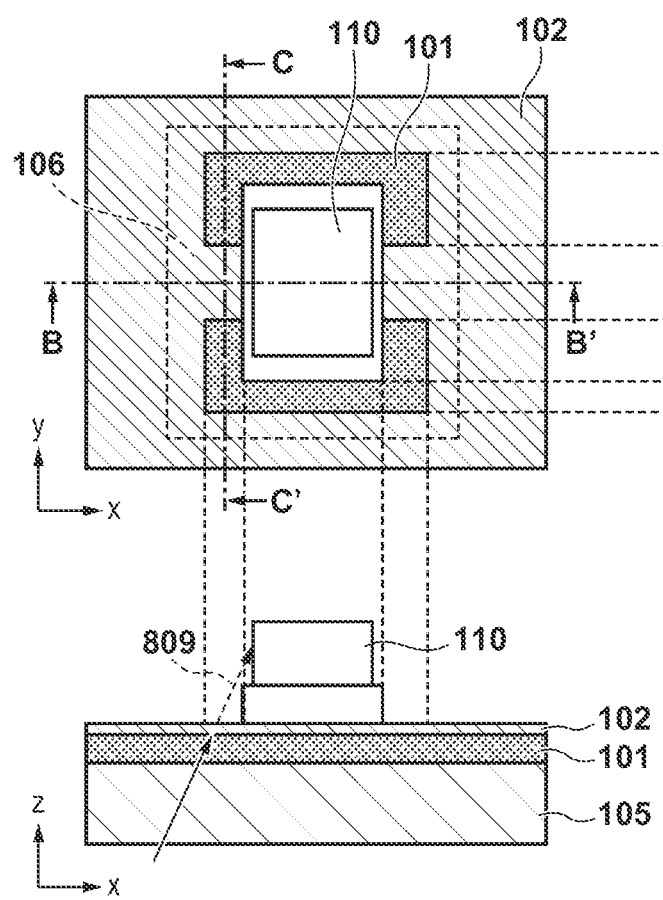
FIG. 9B
FIG. 9C
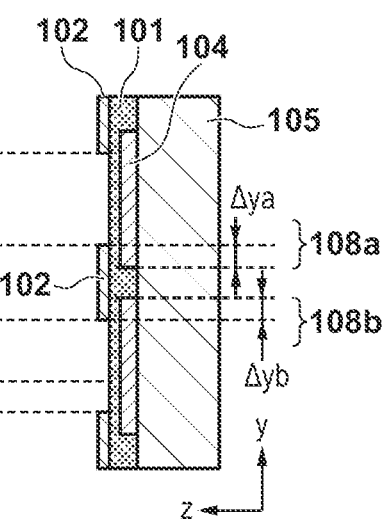

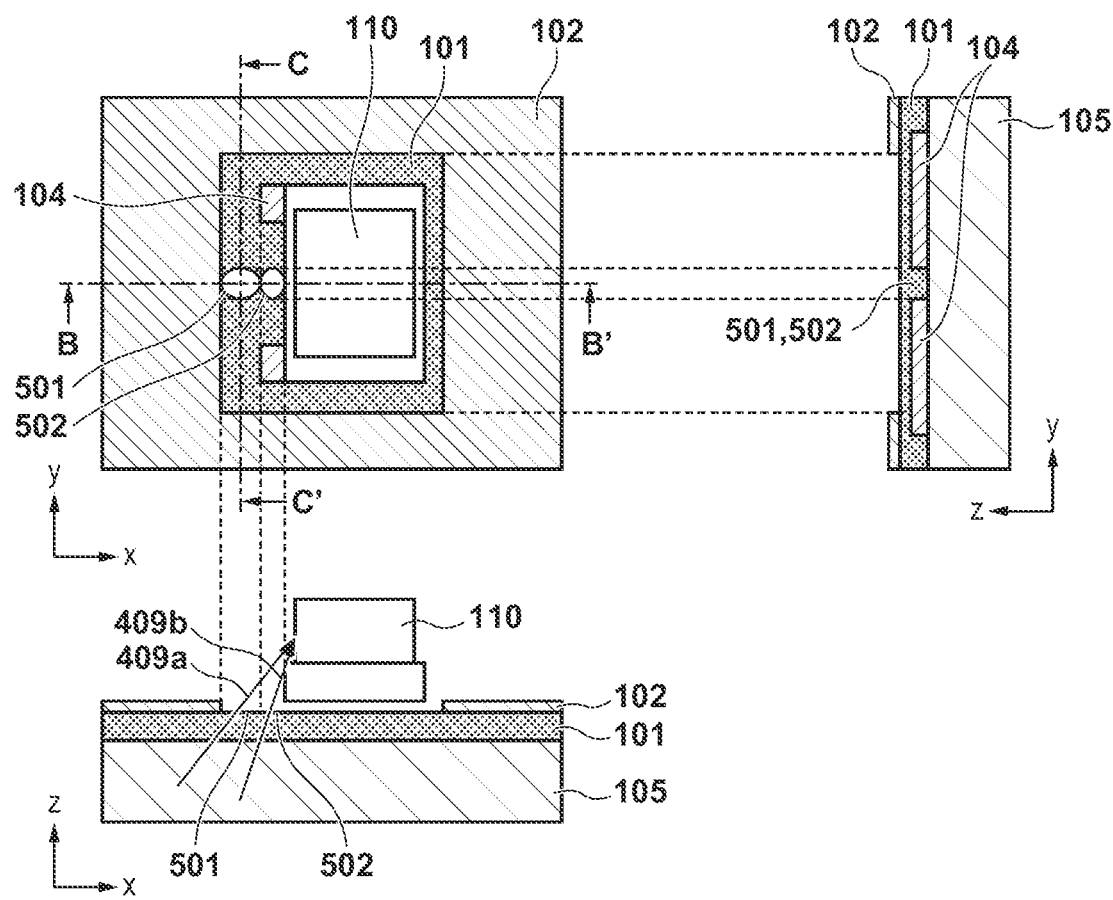

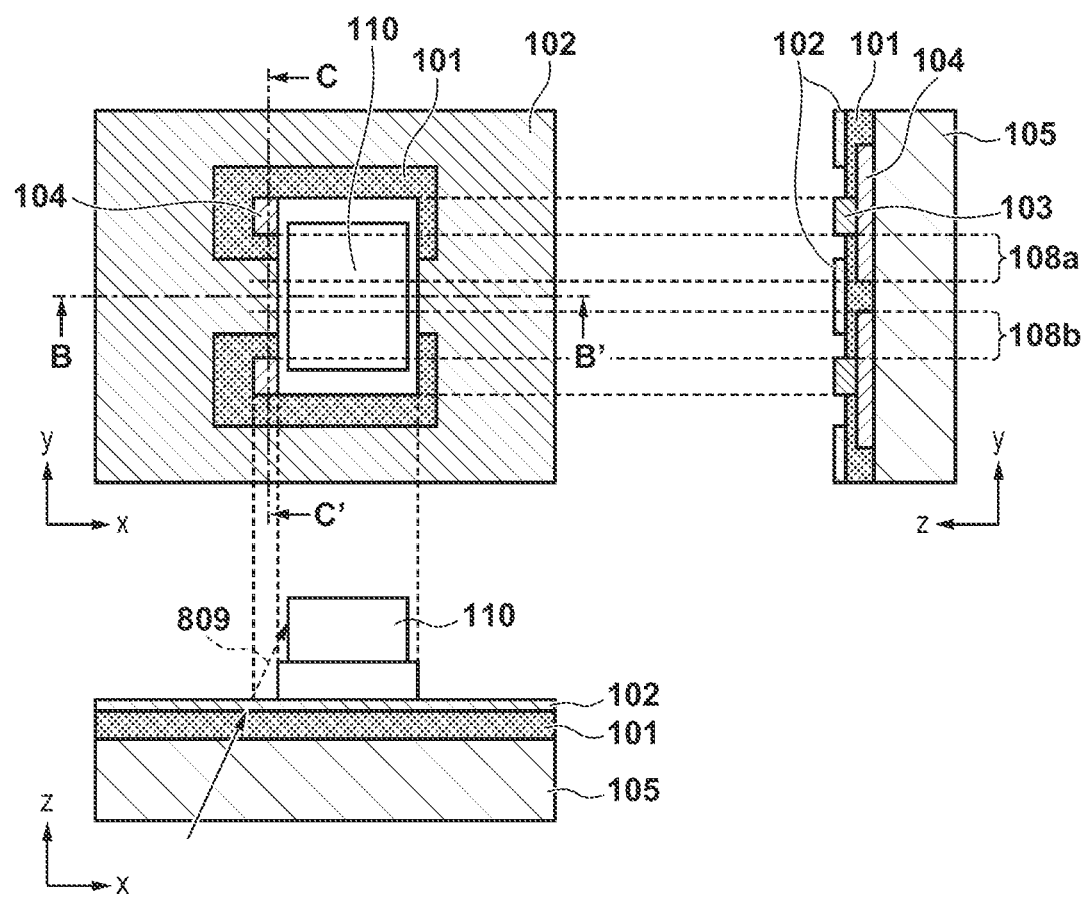

METHOD OF REDUCING EFFECT OF STRAY LIGHT IN OPTICAL SENSOR

BACKGROUND OF THE INVENTION

Field of the Invention

The present disclosure relates to a method of reducing an effect of stray light in an optical sensor.

Description of the Related Art

Optical sensors in which light is emitted from a light emitting element mounted on a substrate to a portion to be irradiated and light reflected from an irradiated portion is received by a light receiving element are known. In such optical sensors, unintended light (stray light) from a light emitting element may enter a light receiving element via a substrate. When stray light enters the light receiving element, a detection accuracy of an optical sensor may decrease. Japanese Patent Laid-Open No. 11-354832 proposes covering a substrate surface with a black resist in order to prevent stray light from entering a light receiving element. Japanese Patent Laid-Open No. 2006-267644 proposes covering a substrate surface with a light shielding coating (silk print). Japanese Patent Laid-Open No. 2019-197072 proposes covering a substrate surface with patterns.

However, in the inventions described in Japanese Patent Laid-Open No. 11-354832 and Japanese Patent Laid-Open No. 2006-267644, in a vicinity of lands on a substrate on which a light emitting element and a light receiving element are mounted, there may be a portion (a gap) in which the substrate is not covered with a black resist or a light shielding coating due to limitations in manufacturing substrates. Therefore, there is room for improvement in occurrence of stray light in this gap in Japanese Patent Laid-Open No. 11-354832 and Japanese Patent Laid-Open No. 2006-267644. In the invention of Japanese Patent Laid-Open No. 2019-197072, due to enlargement of mounting lands, it is easier for heat to escape at the time of mounting a light emitting element and a light receiving element, and so, a mounting defect may occur.

SUMMARY OF THE INVENTION

The present disclosure provides an optical sensor comprising: a light emitting unit configured to emit and output light; a light receiving unit configured to receive light outputted from the light emitting unit and reflected by an object to be irradiated; a substrate on which the light emitting unit and the light receiving unit are mounted; an electrically conductive pattern formed on the substrate, and including a land to be electrically connected to an electrode of the light emitting unit; a resist arranged as a layer above the electrically conductive pattern or the substrate; a light shielding layer provided as a layer above the resist; and a light shielding region formed by a portion of the land and a portion of the light shielding layer overlapping in the direction of the normal of a mounting surface of the substrate, thereby the light shielding region configured to shield stray light directed towards the substrate from the light emitting uni.

Further features of the present invention will become apparent from the following description of exemplary embodiments (with reference to the attached drawings).

BRIEF DESCRIPTION OF THE DRAWINGS

FIGS. 2A-2C are diagrams illustrating a stray light countermeasure of an optical sensor according to a first embodiment.

FIGS. 3A-3C are diagrams for explaining effects of the first embodiment.

FIGS. 5A-5C are diagrams illustrating a mounting position shift.

FIGS. 6A-6C are diagrams for explaining effects of the second embodiment.

FIGS. 8A-8C are diagrams for explaining effects of the third embodiment.

FIGS. 9A-9C are diagrams illustrating a stray light countermeasure of an optical sensor according to a fourth embodiment.

FIGS. 10A-10C are diagrams illustrating a mounting position shift.

FIGS. 11A-11C are diagrams for explaining effects of the fourth embodiment.

DESCRIPTION OF THE EMBODIMENTS

Figure 1:
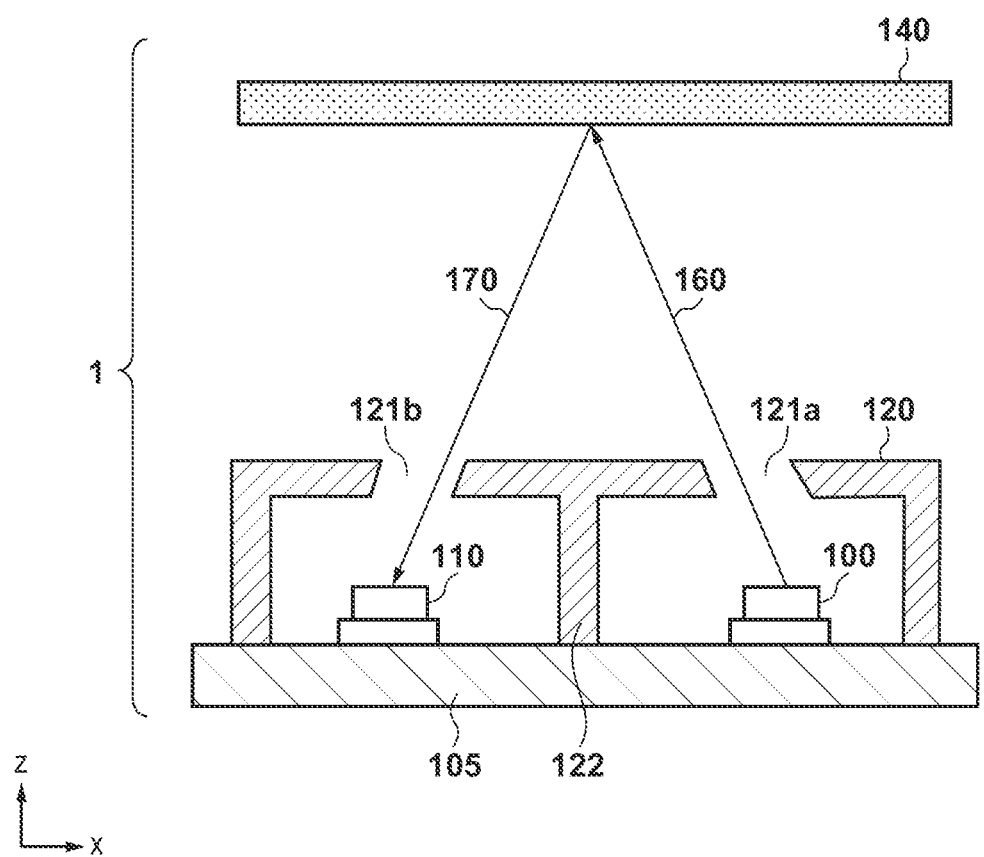
FIG. 1 is a schematic diagram of an optical sensor.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[Optical Sensor]

FIG. 1 illustrates an optical sensor 1 in an embodiment. z indicates a height direction of the optical sensor 1. x represents a direction parallel to a surface on a substrate 105 to which the optical sensor 1 is mounted.

An LED 100, which is a light emitting element, and a PD 110, which is a light receiving element, are mounted on the mounting surface of the substrate 105. LED is an abbreviation for light emitting diode. PD is an abbreviation for photodiode. An aperture 120, which is an optical diaphragm, is also mounted on the mounting surface of the substrate 105. The aperture 120 includes openings 121a and 121b and a light shielding wall 122. The light shielding wall 122 is provided so as to surround the LED 100 and the PD 110, respectively. Light outputted from the LED 100 passes through the opening 121a. Light arriving from outside passes through the opening 121b. The aperture 120 acts to narrow the light outputted from the LED 100 and the light arriving from the outside. A reflecting plate 140 is included so as to face the substrate 105. The light outputted from the LED 100 irradiates the reflecting plate 140 along an optical path 160. The light is reflected by the reflecting plate 140, and the reflected light enters the PD 110 along an optical path 170. The PD 110 outputs a signal corresponding to the received light.

[Countermeasure Against Stray Light]

FIG. 2A is a plan view illustrating a vicinity of the LED 100. FIG. 2B is a cross-sectional view along B-B' in a vicinity of the LED 100. FIG. 2C is a cross-sectional view along C-C' in a vicinity of the LED 100. y is perpendicular to the z direction and the x direction and is a direction parallel to the mounting surface of the substrate 105.

Patterns 104 constituting of copper foil are formed or stacked on a surface of the substrate 105. A z direction thickness of a pattern 104 is, for example, 35 μm. μm is an abbreviation for micrometer. There is solder 103 between the LED 100 and the patterns 104. Electrodes 107a and 107b of the LED 100 and the patterns 104 are connected by the solder 103 to be electrically conductive. A resist 101 is an insulating layer provided on a layer above the substrate 105 and the patterns 104. A z direction thickness of the resist 101 is, for example, 30 μm. A black silk print 102 is formed on the resist 101. The black silk print 102 is formed by, for example, non-conductive epoxy ink or the like. A z direction thickness of the black silk print 102 is, for example, 30 μm. The numerical values of these thicknesses are only one example and can be changed according to manufacturing conditions.

A portion of a pattern 104 formed on the substrate 105 forms a land. The electrodes 107a and 107b provided on a bottom surface of the LED 100 are soldered to the lands. A non-soldered region of a surface of a pattern 104 is covered with the resist 101. As such, the resist 101 includes a portion covering the surface of the substrate 105 and a portion covering a pattern 104. A portion of a pattern 104 covered by the resist 101 or a portion of the resist 101 covering a pattern 104 is referred to as an over-resist portion 108. As illustrated in FIGS. 2B and 2C, a surface area of the patterns 104 formed as a layer below the resist 101 is larger than a surface area of the electrodes 107a and 107b of the LED 100.

The patterns 104 and the black silk print 102 are highly effective in shielding light emitted from the LED 100. Therefore, the patterns 104 and the black silk print 102 can effectively prevent stray light from passing through the substrate 105. Generally, the resist 101 has a light transmitting property and does not have a high light shielding property. For example, a color of the resist 101 is green or the like.

Light passing through a route as indicated by an arrow 109 is shielded by the black silk print 102 and is prevented from passing through the substrate 105. The black silk print 102 is employed here as the silk print; however, this is only one example. A silk print of any color can be employed in place of the black silk print 102 so long as the silk print has a light shielding property (light reducing property) against a color (wavelength) of light emitted by the LED 100. For example, if the color of light emitted by the LED 100 is red, blue may be selected as the color of the silk print. If the surface of the substrate 105 can be covered with a light shielding material, such as the patterns 104 or the black silk print 102, without any gap, stray light will be sufficiently reduced.

A surface area of the lands is larger than the surface area of the electrodes 107a and 107b; however, a non-soldered portion of a land is covered by the resist 101. Therefore, the solder is less likely to spread out of the lands. Therefore, a mounting defect is less likely to occur in a vicinity of the lands.

By design, overlapping distances Δx and Δy of the over-resist portion 108 and the black silk print 102 are each made to be 0.3 mm or more. That is, when there is no position shift between the patterns 104 and the black silk print 102 during a substrate manufacturing process, the overlapping distances Δx and Δy are each 0.3 mm or more. Even if a position shift occurs during the substrate manufacturing process, since the surface of the substrate 105 is covered by the patterns 104 and the black silk print 102, stray light directed towards the substrate 105 is sufficiently reduced. These numerical values are only one example and are based on a premise that formation position errors between the patterns 104 and the black silk print 102 on the substrate 105 are each ±0.1 mm. These numerical values can be changed according to accuracy of substrate manufacturing. By taking into account the formation position errors and covering the surface of the substrate 105 without a gap between the over-resist portion 108 and the black silk print 102, stray light is reduced. For example, theoretical Δx and Δy can be obtained from the following equations based on minimum overlapping distances xmin and ymin (e.g., 0.1 mm) for stray light to not occur and formation position errors xerr and yerr (e.g., 0.1 mm).

$$\Delta x \geq 2 \times x_{min} + x_{err} \quad \text{EQ1}$$

$$\Delta y \geq 2 \times y_{min} + y_{err} \quad \text{EQ2}$$

A frame region formed by the over-resist portion 108 and the black silk print 102 thus overlapping may be referred to as a light shielding region 106. That is, the overlapping distances Δx and Δy indicate widths of a frame of the light shielding region 106.

FIGS. 3A to 3C illustrate a case where a position shift of the patterns 104 and a position shift of the black silk print 102 are at a maximum in the vicinity of the LED 100 illustrated in FIGS. 2A to 2C. In particular, the patterns 104 are shifted in a direction (−x direction) indicated by an arrow 301a from an ideal position in the design. The black silk print 102 is shifted in a direction (+x direction) indicated by an arrow 301b from an ideal position in the design. It is assumed that there is no position shift of the resist 101. As illustrated in FIG. 3B and the like, when the patterns 104 and the black silk print 102 are shifted in position in opposite directions, an overlapping distance of a right over-resist portion 108 between left and right over-resist portions 108 and the black silk print 102 is reduced. Here, an overlapping distance is determined taking into account position shifts. Therefore, even when a shift amount in a formation position is at a maximum, the overlapping distance is 0.1 mm. In FIG. 3B, stray light indicated by the arrow 109 is directed towards a gap between a pattern 104 and the black silk print 102 but is shielded by the pattern 104. As described above, a distance over which a pattern 104 and the black silk print 102 overlap need only be set to a distance of a degree at which stray light can be prevented from actually occurring, and the above numerical values are only one example.

The over-resist portion 108 and the black silk print 102 are designed so that the over-resist portion 108 and the black silk print 102 overlap by a certain amount or more in a state in which there is no a position shift. Thus, even if a position shift occurs in the substrate manufacturing process, stray light is prevented in a vicinity of the lands. That is, by the over-resist portion 108 and the black silk print 102 overlapping by a certain amount or more, even if a position shift occurs, at least one of the black silk print 102 and the patterns 104 can block stray light. In the present embodiment, when the substrate 105 is viewed from above, the over-resist portion 108 and the black silk print 102 need only overlap over a certain distance, and so a mountability of the LED 100 is not hindered.

Second Embodiment

Figure 4A:
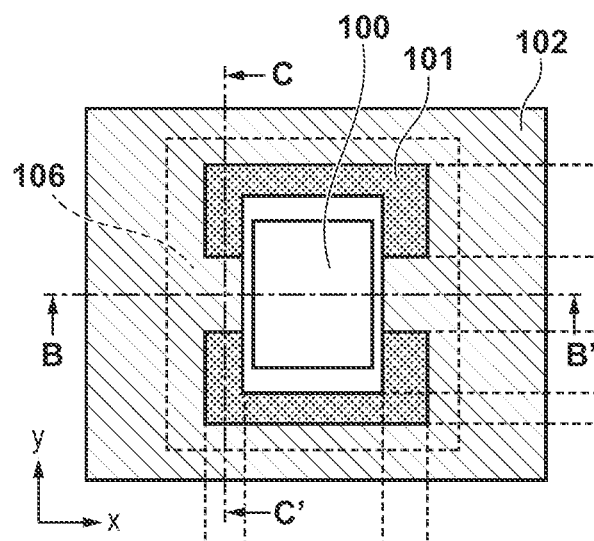
FIGS. 4A-4C are diagrams illustrating a stray light countermeasure of an optical sensor according to a second embodiment.
Figure 4C:
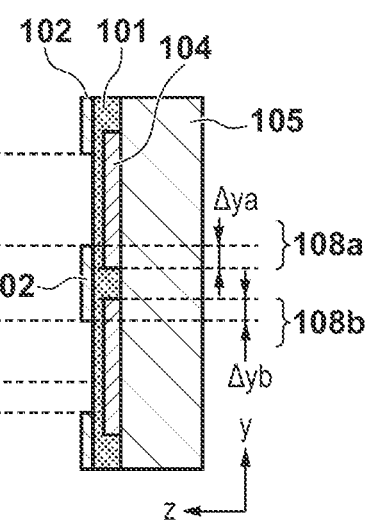
Figure 4B:
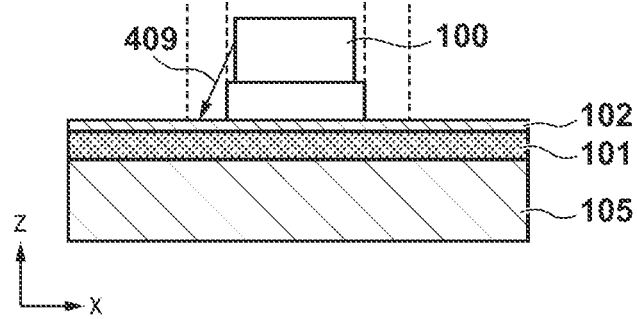

FIG. 4A is a plan view illustrating a vicinity of the LED 100. FIG. 4B is a cross-sectional view along B-B' in a vicinity of the LED 100. FIG. 4C is a cross-sectional view along C-C' in a vicinity of the LED 100. In a second embodiment, the same reference numerals are assigned to matters that are the same or similar to the first embodiment, and descriptions thereof are incorporated.

When FIG. 4A and FIG. 2A are compared, in the second embodiment, the surface area of the black silk print 102 is increased. In particular, the black silk print 102 has been added to both sides of the LED 100 in the x direction. Thus, the surface area of the light shielding region 106 is increased. In FIG. 4B, an arrow 409 indicates a route of stray light.

FIG. 5A illustrates a case where a mounting position of the LED 100 illustrated in FIG. 4A is shifted in the +x direction. A region 501 illustrated in FIG. 5A is a region in which stray light can occur. As illustrated in FIG. 5C, in the second embodiment, there are two patterns 104 corresponding to the two electrodes 107a and 107b of the LED 100, and a slight gap (insulating distance) is maintained between the two patterns 104. Therefore, stray light directed towards the substrate 105 via the region 501 may occur.

A region 502 illustrated in FIGS. 5A and 5C is a region that is the cause of stray light when a mounting position shift occurs. The region 502 also corresponds to a small gap present between the two patterns 104. As illustrated in FIG. 5B, an arrow 409a indicates a route of stray light passing through the region 501. An arrow 409b indicates a route of stray light passing through the region 502.

In the second embodiment, in a state in which there is no position shift, as illustrated in FIG. 4C, an overlapping distance Δya between an over-resist portion 108a and the black silk print 102 is 0.3 mm. Similarly, an overlapping distance Δyb between an over-resist portion 108b and the black silk print 102 is 0.3 mm. Thus, even if a position shift occurs in the substrate manufacturing process, since the region 501 is covered without a gap by the black silk print 102, the surface of the substrate 105 is not exposed. In the second embodiment, the concept of formation position errors between the patterns 104 and the black silk print 102 is the same as in the first embodiment, and so the description thereof will be omitted.

FIGS. 6A to 6C illustrate a case where a position shift (displacement) of the LED 100 with respect to the pattern 104 and the black silk 102 existing in the vicinity of the LED 100 illustrated in FIGS. 4A to 4C has occurred. In this example, the position shift occurs in the +x direction.

As illustrated in FIGS. 6A to 6C, even if the mounting position of the LED 100 is shifted in the +x direction, the surface of the substrate 105 (the region 502) is not exposed. This is because the region 502 is covered by an additional light shielding region formed by the over-resist portions 108a and 108b and the black silk print 102. Therefore, stray light is prevented from occurring in the region 502.

In the first embodiment, the central black silk print 102 is not employed. This is because floating of components or the like occurs due to the black silk print 102 being disposed below the LED 100. That is, in the first embodiment, another contrivance is necessary for preventing the floating of components or the like.

In the second embodiment, the over-resist portions 108a and 108b and the black silk print 102 are arranged so as to overlap 0.3 mm or more. However, the numerical value is only one example. Even if a position shift occurs in the substrate manufacturing process, stray light directed between the two electrodes of the LED 100 may be prevented from entering the substrate 105. Therefore, a distance (surface area) over which the over-resist portions 108a and 108b and the black silk print 102 overlap may be another numerical value.

As described above, in the second embodiment, the over-resist portions 108a and 108b and the black silk print 102 are also disposed so as to overlap each other between the two electrodes of the LED 100. Thus, in the second embodiment, it is possible to further reduce stray light as compared with the first embodiment.

Third Embodiment

Figure 7A:
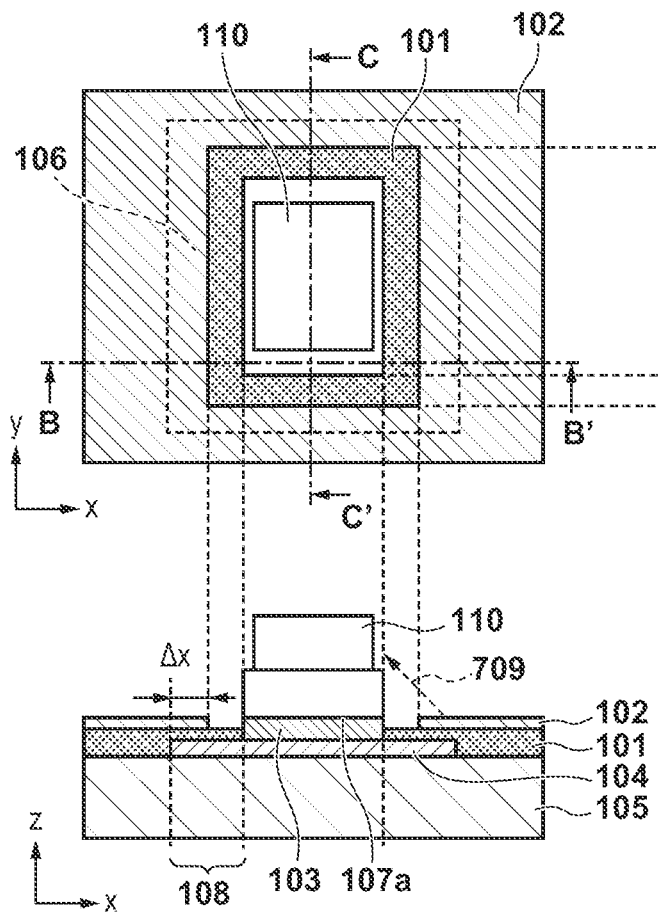
FIGS. 7A-7C are diagrams illustrating a stray light countermeasure of an optical sensor according to a third embodiment.
Figure 7B:
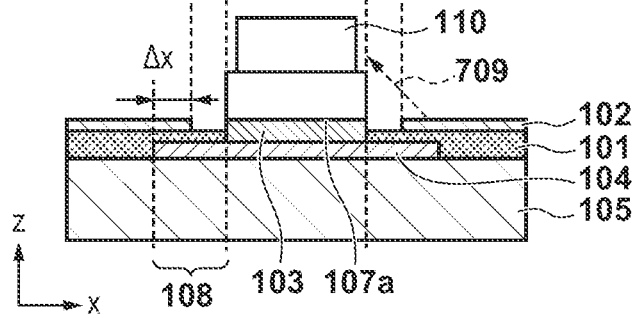
Figure 7C:
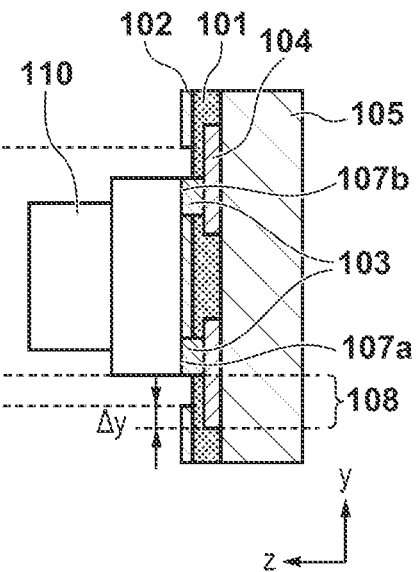

FIG. 7A is a plan view illustrating a vicinity of the PD 110. FIG. 7B is a cross-sectional view along B-B' in a vicinity of the PD 110. FIG. 7C is a cross-sectional view along C-C' in a vicinity of the PD 110. FIGS. 7A to 7C illustrate that the LED 100 of FIGS. 2A to 2C can be replaced by the PD 110. That is, the technical concept of the first embodiment is applicable to the PD 110.

The patterns 104 constituting of copper foil are formed or stacked on a surface of the substrate 105. A z direction thickness of a pattern 104 is, for example, 35 μm. There is the solder 103 between the electrodes 107a and 107b of the PD 110 and the patterns 104. The electrodes 107a and 107b of the PD 110 and the patterns 104 are connected by the solder 103 to be electrically conductive. The resist 101 is an insulating layer provided on a layer above the substrate 105 and the patterns 104. The resist 101 also covers a side surface of the solder 103. A z direction thickness of the resist 101 is, for example, 30 μm. The black silk print 102 is formed on the resist 101. The black silk print 102 is formed by, for example, non-conductive epoxy ink or the like. A z direction thickness of the black silk print 102 is, for example, 30 μm. The numerical values of these thicknesses are only one example and can be changed according to manufacturing conditions.

A portion of a pattern 104 formed on the substrate 105 forms a land, and the electrodes 107a and 107b provided on a bottom surface of the PD 110 are soldered to the lands. A non-soldered region of a surface of a pattern 104 is covered with the resist 101. As such, the resist 101 includes a portion covering the surface of the substrate 105 and a portion covering a pattern 104. A portion of a pattern 104 covered by the resist 101 or a portion of the resist 101 covering a pattern 104 is referred to as the over-resist portion 108. As illustrated in FIGS. 7B and 7C, the surface area of the patterns 104 formed as a layer below the resist 101 is larger than the surface area of the electrodes 107a and 107b of the PD 110.

The patterns 104 and the black silk print 102 are highly effective in shielding stray light directed towards the PD 110 from the substrate 105. Therefore, the patterns 104 and the black silk print 102 can effectively prevent stray light from passing through the substrate 105. Generally, the resist 101 has a light transmitting property and does not have a high light shielding property. For example, a color of the resist 101 is green or the like.

Light passing through a route as indicated by an arrow 709 is shielded by the black silk print 102 and is prevented from entering the PD 110 from the substrate 105. The black silk print 102 is employed here as the silk print; however, this is only one example. A silk print of any color can be employed in place of the black silk print 102 so long as the silk print has a light shielding property (light reducing property) against a color (wavelength) of light received by the PD 110. For example, if the color of light received by the PD 110 is red, blue may be selected as the color of the silk print. If the surface of the substrate 105 can be covered with a light shielding material, such as the patterns 104 or the black silk print 102, without any gap, stray light will be sufficiently reduced.

A surface area of the lands is larger than the surface area of the electrodes 107a and 107b; however, a non-soldered portion of a land is covered by the resist 101. Therefore, the solder is less likely to spread out of the lands. Therefore, a mounting defect is less likely to occur in a vicinity of the lands.

By design, overlapping distances Δx and Δy of the over-resist portion 108 and the black silk print 102 are each maintained to be 0.3 mm or more. That is, when there is no position shift between the patterns 104 and the black silk print 102 during a substrate manufacturing process, the overlapping distances Δx and Δy are each 0.3 mm or more. Even if a position shift occurs during the substrate manufacturing process, since the surface of the substrate 105 is covered by the patterns 104 and the black silk print 102, stray light directed towards the substrate 105 is sufficiently reduced. These numeral values are only one example and are based on a premise that formation position errors between the patterns 104 and the black silk print 102 on the substrate 105 are each ±0.1 mm. These numerical values can be changed according to accuracy of substrate manufacturing. By taking into account the formation position errors and covering the surface of the substrate 105 without a gap between the over-resist portion 108 and the black silk print 102, stray light is reduced. For example, Δx and Δy for design can be obtained from the following equations based on minimum overlapping distances xmin and ymin (e.g., 0.1 mm) for stray light to not occur and formation position errors xerr and yerr (e.g., 0.1 mm).

$$\Delta x \geq 2 \times x\ min + xerr \qquad \text{EQ3}$$

$$\Delta y \geq 2 \times y\ min + yerr \qquad \text{EQ4}$$

A frame region formed by the over-resist portion 108 and the black silk print 102 thus overlapping may be referred to as the light shielding region 106. That is, the overlapping distances Δx and Δy indicate widths of a frame of the light shielding region 106.

FIGS. 8A to 8C illustrate a case where a position shift of the patterns 104 and a position shift of the black silk print 102 are at a maximum in the vicinity of the PD 110 illustrated in FIGS. 7A to 7C. In particular, the patterns 104 are shifted in a direction (−x direction) indicated by an arrow 301a from an ideal position in the design. The black silk print 102 is shifted in a direction (+x direction) indicated by an arrow 301b from an ideal position in the design. It is assumed that there is no position shift of the resist 101. As illustrated in FIG. 8B and the like, when the patterns 104 and the black silk print 102 are shifted in position in opposite directions, an overlapping distance of a right over-resist portion 108 between left and right over-resist portions 108 and the black silk print 102 is reduced. Here, an overlapping distance is determined taking into account position shifts. Therefore, even when a shift amount in a formation position is at a maximum, the overlapping distance is 0.1 mm. In FIG. 8B, stray light indicated by the arrow 709 is prevented by a pattern 104 or the black silk print 102. As described above, a distance over which a pattern 104 and the black silk print 102 overlap need only be set to a large enough distance that stray light can be prevented from actually occurring, and the above numerical values are only one example.

The over-resist portion 108 and the black silk print 102 are designed so that the over-resist portion 108 and the black silk print 102 overlap by a certain amount or more in a state in which there is no a position shift. Thus, even if a position shift occurs in the substrate manufacturing process, stray light is prevented in a vicinity of the lands. That is, by the over-resist portion 108 and the black silk print 102 overlapping by a certain amount or more, even if a position shift occurs, at least one of the black silk print 102 and the patterns 104 can block stray light. In the present embodiment, when the substrate 105 is viewed from above, the over-resist portion 108 and the black silk print 102 need only overlap over a certain distance, and so a mountability of the PD 110 is not hindered.

Fourth Embodiment

FIG. 9A is a plan view illustrating a vicinity of the PD 110. FIG. 9B is a cross-sectional view along B-B' in a vicinity of the PD 110. FIG. 9C is a cross-sectional view along C-C' in a vicinity of the PD 110. In a second embodiment, the same reference numerals are assigned to matters that are the same or similar to the first embodiment, and descriptions thereof are incorporated. FIGS. 9A to 9C illustrate that the LED 100 of FIGS. 4A to 4C can be replaced by the PD 110.

When FIG. 9A and FIG. 7A are compared, in the second embodiment, the surface area of the black silk print 102 is increased. In particular, the black silk print 102 has been added to both sides of the PD 110 in the x direction. Thus, the surface area of the light shielding region 106 is increased. In FIG. 9B, an arrow 809 indicates a route of stray light.

FIG. 10A illustrates a case where a mounting position of the PD 110 illustrated in FIG. 9A is shifted in the +x direction. The region 501 illustrated in FIG. 10A is a region in which stray light can occur. As illustrated in FIGS. 10A and 10C, there are two patterns 104 corresponding to the two electrodes 107a and 107b of the PD 110, and a slight gap (insulating distance) is maintained between the two patterns 104. Therefore, stray light directed towards the PD 110 from the substrate 105 via the region 501 may occur.

The region 502 illustrated in FIG. 10A is a region in which stray light is caused when a mounting position shift occurs. The region 502 also corresponds to a small gap present between the two patterns 104. As illustrated in FIG. 10B, the arrow 409a indicates a route of stray light passing through the region 501. An arrow 409b indicates a route of stray light passing through the region 502.

In a fourth embodiment, in a state in which there is no position shift, as illustrated in FIG. 9C, an overlapping distance Δya between the over-resist portion 108a and the black silk print 102 is 0.3 mm. Similarly, an overlapping distance Δyb between an over-resist portion 108b and the black silk print 102 is 0.3 mm. Thus, even if a position shift occurs in the substrate manufacturing process, since the region 501 is covered without a gap by the black silk print 102, the surface of the substrate 105 is not exposed. In the fourth embodiment, the concept of formation position errors between the patterns 104 and the black silk print 102 is the same as in the third embodiment, and so the description thereof will be omitted.

FIGS. 11A to 11C illustrate a case where a position shift of the PD 110 with respect to the pattern 104 and the black silk 102 existing in the vicinity of the PD 110 illustrated in FIGS. 9A to 9C has occurred. In this example, the position shift occurs in the +x direction.

As illustrated in FIGS. 11A to 11C, even if the mounting position of the PD 110 shifts in the +x direction, the surface of the substrate 105 (the region 502) is not exposed. This is because the region 502 is covered by an additional light shielding region formed by the over-resist portions 108a and 108b and the black silk print 102. Therefore, stray light is prevented from occurring in the region 502.

In the third embodiment, the central black silk print 102 is not employed. This is because floating of components or the like occurs due to the black silk print 102 being disposed below the PD 110. That is, another contrivance is necessary for preventing the floating of components or the like.

In the fourth embodiment, the over-resist portions 108a and 108b and the black silk print 102 are arranged so as to overlap 0.3 mm or more. However, the numerical value is only one example. Even if a position shift occurs in the substrate manufacturing process, stray light directed towards the PD 110 through a space between the two electrodes of the PD 110 may be prevented from entering the substrate 105. Therefore, a distance (surface area) over which the over-resist portions 108a and 108b and the black silk print 102 overlap may be another numerical value.

As described above, in the fourth embodiment, the over-resist portions 108a and 108b and the black silk print 102 are also disposed so as to overlap each other between the two electrodes of the PD 110. Thus, in the fourth embodiment, it is possible to further reduce stray light as compared with the third embodiment.

Fifth Embodiment

Figure 12:
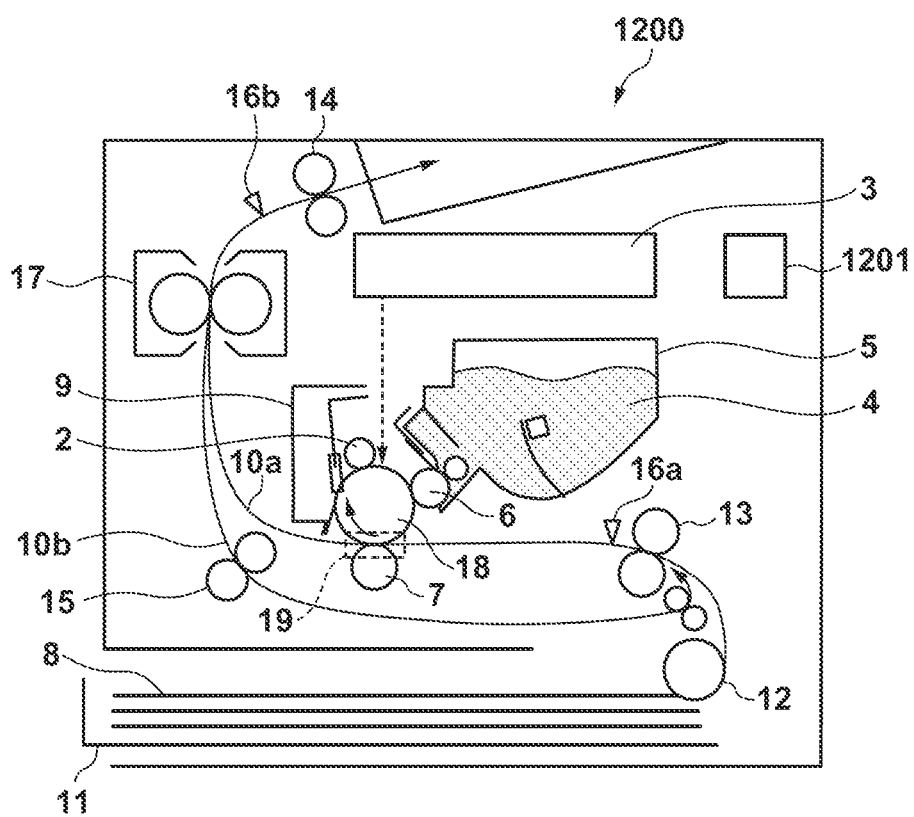
FIG. 12 is a schematic diagram of an image forming apparatus including a sheet conveyance apparatus.

FIG. 12 illustrates an electrophotographic image forming apparatus 1200. A photosensitive drum 18 is an image carrier having an organic photoconductor (OPC) photosensitive layer. The photosensitive drum 18 rotates in an arrow direction at a predetermined processing speed. A charging roller 2 charges a surface of the charging roller 2 so that a potential on a surface of the photosensitive drum 18 becomes a predetermined potential. A laser beam scanner 3 forms an electrostatic latent image by exposing the surface of the photosensitive drum 18 by outputting laser light in accordance with an image signal.

A developer container 5 holds toner 4. A developer carrying member 6 forms a toner image by developing the electrostatic latent image using the toner 4.

The toner image is conveyed to a transfer unit 19 by the photosensitive drum 18 rotating. The transfer unit 19 is configured by the photosensitive drum 18 and a transfer roller 7. A sheet cassette 11 is a container for holding a large number of sheets 8. A feeding roller 12 feeds one sheet 8 from the sheet cassette 11 to a conveyance path 10a. Conveyance rollers 13 convey the sheet 8 to the transfer unit 19 along the conveyance path 10a. A sheet sensor 16a is disposed downstream of the conveyance rollers 13. The laser beam scanner 3 outputs a laser beam based on a timing at which the sheet sensor 16a detects a leading edge of the sheet 8. By this, a timing at which the toner image arrives at the transfer unit 19 and a timing at which the sheet 8 arrives at the transfer unit 19 are synchronized.

The transfer unit 19 transfers the toner image from the photosensitive drum 18 to the sheet 8. The remaining toner 4 of the photosensitive drum 18 is collected in a cleaning container 9. The photosensitive drum 18, the charging roller 2, the developer container 5, and the cleaning container 9 are integrally provided and may be referred to as a process cartridge.

The sheet 8 is conveyed from the transfer unit 19 to a fixing unit 17. The fixing unit 17 applies heat and pressure to the toner image and the sheet 8 to fix the toner image on the sheet 8. Discharge rollers 14 discharge the sheet 8 to outside of the image forming apparatus 1200. In duplex printing, when a sheet sensor 16b detects a trailing edge of the sheet 8 on which an image has been formed on a first surface, a rotational direction of the discharge rollers 14 are switched from forward rotation to backward rotation. By this, the sheet 8 is fed from the conveyance path 10a to a conveyance path 10b (switchback conveyance).

Conveyance rollers 15 provided in the conveyance path 10b pass the sheet 8 to the conveyance rollers 13. The conveyance rollers 13 feed the sheet 8 to the transfer unit 19 again. The transfer unit 19 transfers a toner image from the photosensitive drum 18 to a second surface of the sheet 8. The sheet 8 is then conveyed to the fixing unit 17. The fixing unit 17 fixes the toner image to the second surface of the sheet 8. The discharge rollers 14 discharge the sheet 8 for which duplex printing has been completed to the outside of the image forming apparatus 1200.

The toner 4 is fixed on the sheet 8 while being applied heat and pressure by the fixing unit 17. By this, printed matter constituting of the sheet 8 and the toner image is subjected to antibacterial processing.

FIG. 12 illustrates the image forming apparatus 1200 for forming a monochrome image; however, technical concepts of the present invention are also applicable to an image forming apparatus for forming a full color image. Further, the sheet 8 may be pre-print paper on which printing has already been performed.

The sheet sensors 16a and 16b are realized by the above-described optical sensor 1. An effect of stray light is reduced in the optical sensor 1. Therefore, an accuracy of detection of the sheet 8 by the sheet sensors 16a and 16b realized by the optical sensor 1 is improved. As a result, a conveyance accuracy of the sheet 8 is improved, and an accuracy for a formation position of a toner image formed on the sheet 8 is also improved.

As described above, in the present embodiment, a description has been given for an example in which the optical sensor 1 is applied to the sheet sensors 16a and 16b for detecting the leading edge and the trailing edge of the sheet 8. However, this is only one example.

For example, the optical sensor 1 may be applied as a media sensor for detecting a surface state of the sheet 8 by irradiating light on a surface of the sheet 8 and receiving reflected light. Here, the surface state of the sheet 8 indicates information, such as depths of and spacing between unevenness of the sheet 8. The information obtained by the media sensor is transmitted to a control unit 1201. The control unit 1201 sets a conveyance speed of the sheet 8, a transfer bias for when a toner image is transferred to the sheet 8, a fixing temperature for when the toner image is fixed to the sheet 8, and the like based on the obtained information. By thus setting image forming conditions according to the surface state of the sheet 8, it is possible to form a high-quality image on the sheet 8.

An application example of the optical sensor 1 includes a density detection sensor. The density detection sensor is a sensor for confirming whether an optical density of a toner image formed on the sheet 8 falls within a predetermined range. The density detection sensor includes a light emitting unit and a light receiving unit (at least two light receiving units, one for regularly reflected light and the other for diffusely reflected light). The density detection sensor is configured to irradiate light onto a toner pattern for density detection formed on the sheet 8 and receive reflected light thereof. The information obtained by this sensor is transmitted to the control unit 1201. The control unit 1201 can adjust a density of a toner pattern by adjusting an image signal and then an exposure amount of the photosensitive drum 18, based on the obtained information.

A further application example of the optical sensor 1 includes a color sensor. The color sensor is a sensor for confirming whether a tone of a color toner image formed on the sheet 8 falls within a predetermined range. The color sensor is provided with a light emitting unit, a spectroscopic unit, and a light receiving unit (a line sensor is preferred). The color sensor is configured to irradiate light onto a color toner image formed on the sheet 8 and receive reflected light thereof. The information obtained by the color sensor is transmitted to the control unit 1201. The control unit 1201 can adjust a tone of a color toner image by adjusting an image signal and then an exposure amount of the photosensitive drum 18, based on the obtained information.

Technical Concept Derived from Embodiments

[Aspect 1]

As illustrated in FIG. 1 and the like, the LED 100 is an example of a light emitting unit for emitting and outputting light. The PD 110 is an example of a light receiving unit for receiving light outputted from the light emitting unit and reflected by an object to be irradiated (e.g., the reflecting plate 140 and the sheet 8). The substrate 105 is an example of a substrate on which the light emitting unit and the light receiving unit are mounted. As illustrated in FIG. 2C and the like, the patterns 104 include lands that are electrically connected to the electrodes 107a and 107b of the light emitting unit and are examples of an electrically conductive pattern formed on the substrate. As illustrated in FIG. 2B and the like, the resist 101 is an example of a resist provided as a layer above the electrically conductive pattern or the substrate. The black silk print 102 is an example of a light shielding layer provided as a layer above the resist 101. The light shielding region 106 is an example of a light shielding region formed by a portion of a land and a portion of the light shielding layer overlapping in the direction of the normal (z direction) of a mounting surface of the substrate 105. The light shielding region 106 shields stray light directed from the light emitting unit to the substrate. This makes it possible to reduce stray light while maintaining a mountability of an electronic component (e.g., the LED 100).

[Aspects 2, 3, 9, and 10]

The light shielding layer may be a silk print (e.g., the black silk print 102). The silk print need only have a light shielding property against light of the light emitting unit. Therefore, a color of the silk print may be other than black. Light shielding refers to complete prevention of target light and attenuation of light to an extent that accuracy of the optical sensor 1 is not reduced.

[Aspects 4 and 11]

Assume that errors between a formation position of a land and a formation position of the light shielding layer are maximum errors (e.g., xerr, yerr) anticipated in a substrate manufacturing process. In this case, a portion of the land and a portion of the light shielding layer overlap such that widths (e.g., $\Delta x$, $\Delta y$) of a region in which the portion of the land and the portion of the light shielding layer overlap are 0.1 mm or more. 0.1 mm is only one example of xmin and ymin.

[Aspect 5]

As illustrated in FIG. 2C, lands (e.g., the patterns 104) may include a first land to which a first electrode (e.g., the electrode 107a) of the light emitting unit is connected, and a second land to which a second electrode of the light emitting unit (e.g., the electrode 107b) is connected. As illustrated in FIG. 4C, in the direction of the normal of the mounting surface of the substrate, a portion of the first land and a portion of the light shielding layer overlap, and a portion of the second land and a portion of the light shielding layer overlap. This makes it possible to further improve light shielding performance.

[Aspects 6 and 7]

The light shielding layer may include a partial light shielding layer (e.g., the central black silk print 102 in FIG. 4C) that overlaps with both a portion of the first land and a portion of the second land. As illustrated in FIG. 4B, the partial light shielding layer may be present between the light emitting unit and the resist in the direction of the normal of the mounting surface of the substrate. This makes it possible to further improve light shielding performance.

[Aspect 8]

As illustrated in FIGS. 7B and 7C and the like, the patterns 104 include lands that are electrically connected to the electrodes 107a and 107b of a light receiving unit (e.g., the PD 110) and are examples of an electrically conductive pattern formed on the substrate. As illustrated in FIG. 7A and the like, the light shielding region 106 is an example of the light shielding region formed by a portion of a land and a portion of the light shielding layer overlapping in the direction of the normal (z direction) of the mounting surface of the substrate. As illustrated in FIG. 7B, the light shielding region 106 shields stray light heading from the substrate to the light receiving unit. This makes it possible to reduce stray light while maintaining a mountability of an electronic component (e.g., the PD 110). The PD 110 may be a CMOS image sensor, a CCD image sensor, or the like. CMOS is an abbreviation for complementary metal-oxide semiconductor. CCD is an abbreviation for charge-coupled device.

[Aspect 12]

As illustrated in FIG. 7C, lands (the patterns 104) may include a first land to which a first electrode (e.g., the electrode 107a) of the light receiving unit is connected, and a second land to which a second electrode of the light receiving unit (e.g., the electrode 107b) is connected. As illustrated in FIG. 7C, in the direction of the normal of the mounting surface of the substrate, a portion of the first land and a portion of the light shielding layer overlap, and a portion of the second land and a portion of the light shielding layer overlap.

[Aspects 13 and 14]

As illustrated in FIG. 9C, the light shielding layer may have a partial light shielding layer that overlaps with both of a portion of the first land and a portion of the second land. As illustrated in FIG. 7B, the partial light shielding layer may be present between the light emitting unit and the resist in the direction of the normal of the mounting surface of the substrate.

[Aspect 15]

As illustrated in FIG. 2C, the electrodes 107a and 107b are examples of the first land electrically connected to an electrode of the light emitting unit. As illustrated in FIG. 7C, the electrodes 107a and 107b are examples of the second land electrically connected to an electrode of the light receiving unit.

As illustrated in FIGS. 2B and 2C and the like, in the direction of the normal of the mounting surface of the substrate, a portion of the first land and a portion of the light shielding layer overlap. As illustrated in FIGS. 7B and 7C and the like, a portion of the second land and a portion of the light shielding layer overlap. This makes it possible to reduce stray light while maintaining a mountability for both the light emitting unit and the light receiving unit.

[Aspect 16]

The image forming apparatus 1200 is an example of a sheet conveyance apparatus. The conveyance rollers 13 and 15 of the image forming apparatus 1200 are examples of a conveyance unit for conveying the sheet 8 along a conveyance path. The sheet sensors 16a and 16b including the optical sensor 1 are examples of an optical sensor for detecting the sheet 8 conveyed by the conveyance unit. This makes it possible to improve a detection accuracy of the sheet 8.

[Aspects 17 to 21]

The photosensitive drum 18, the transfer unit 19, and the like are examples of an image forming unit for forming an image on a sheet. Since an image is formed on the sheet 8 based on a detection result of the sheet sensor 16a including the optical sensor 1, it is possible for an error in a formation position of the image with respect to the sheet 8 to be small. The optical sensor 1 may be any of a sheet sensor, a media sensor, a density sensor, and a color sensor, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070267, filed Apr. 21, 2022 which is hereby incorporated by reference herein in its entirety.

What is claimed is:

1. An optical sensor comprising:
   a light emitting element that emits and outputs light;
   a light receiving element that receives light outputted from the light emitting element and reflected by an object to be irradiated;
   a substrate on which the light emitting element and the light receiving unit are mounted;
   an electrically conductive pattern formed on the substrate, the electrically conductive pattern including a land electrically connected to an electrode of the light emitting element;
   a resist arranged as a layer above the electrically conductive pattern or the substrate;
   a light shielding layer provided as a layer above the resist; and
   a light shielding region formed by a portion of the land and a portion of the light shielding layer overlapping in the direction of the normal of a mounting surface of the substrate, the light shielding region thereby configured to shield stray light directed towards the substrate from the light emitting element,
   wherein, when viewed in the direction of the normal of the mounting surface of the substrate, there is a region surrounding the light emitting element without the light shielding layer.

2. The optical sensor according to claim 1, wherein the light shielding layer is a silk print.

3. The optical sensor according to claim 2, wherein the silk print has a light shielding property against the light of the light emitting element.

4. The optical sensor according to claim 1, wherein, when an error between a formation position of the land and a formation position of the light shielding layer is a maximum error predetermined in a substrate manufacturing process, a portion of the land and a portion of the light shielding layer overlap such that a width of a region in which the portion of the land and the portion of the light shielding layer overlap is 0.1 mm or more.

5. The optical sensor according to claim 1, wherein the land includes:
   a first land to which a first electrode of the light emitting element is connected; and
   a second land to which a second electrode of the light emitting element is connected, and
   wherein, in the direction of the normal of the mounting surface of the substrate, a portion of the first land and a portion of the light shielding layer are overlapped and a portion of the second land and a portion of the light shielding layer are overlapped.

6. The optical sensor according to claim 5, wherein the light shielding layer includes:
   a partial light shielding layer that overlaps with both of the portion of the first land and the portion of the second land.

7. The optical sensor according to claim 6, wherein the partial light shielding layer is present between the light emitting element and the resist in the direction of the normal of the mounting surface of the substrate.

8. An optical sensor comprising:
   a light emitting element that emits and outputs light;
   a light receiving element that receives light outputted from the light emitting element and reflected by an object to be irradiated;

a substrate on which the light emitting element and the light receiving element are mounted;
an electrically conductive pattern formed on the substrate, the electrically conductive pattern including a land electrically connected to an electrode of the light receiving element;
a resist arranged as a layer above the electrically conductive pattern or the substrate;
a light shielding layer provided as a layer above the resist; and
a light shielding region formed by a portion of the land and a portion of the light shielding layer overlapping in the direction of the normal of a mounting surface of the substrate, the light shielding region thereby configured to shield stray light directed towards the light receiving element from the substrate,
wherein, when viewed in the direction of the normal of the mounting surface of the substrate, there is a region surrounding the light emitting element without the light shielding layer.

9. The optical sensor according to claim 8, wherein the light shielding layer is a silk print.

10. The optical sensor according to claim 9, wherein the silk print has a light shielding property against the light of the light emitting element.

11. The optical sensor according to claim 8, wherein, when an error between a formation position of the land and a formation position of the light shielding layer is a maximum error predetermined in a substrate manufacturing process, a portion of the land and a portion of the light shielding layer overlap such that a width of a region in which the portion of the land and the portion of the light shielding layer overlap is 0.1 mm or more.

12. The optical sensor according to claim 8, wherein the land includes:
a first land to which a first electrode of the light receiving element is connected; and
a second land to which a second electrode of the light receiving element is connected, and
wherein, in the direction of the normal of the mounting surface of the substrate, a portion of the first land and a portion of the light shielding layer are overlapped and a portion of the second land and a portion of the light shielding layer are overlapped.

13. The optical sensor according to claim 12, wherein the light shielding layer includes:
a partial light shielding layer that overlaps with both of the portion of the first land and the portion of the second land.

14. The optical sensor according to claim 13, wherein the partial light shielding layer is present between the light emitting element and the resist in the direction of the normal of the mounting surface of the substrate.

15. An optical sensor comprising:
a light emitting element that emits and outputs light;
a light receiving element that receives light outputted from the light emitting element and reflected by an object to be irradiated;
a substrate on which the light emitting element and the light receiving element are mounted;
an electrically conductive pattern formed on the substrate, the electrically conductive pattern including a first land electrically connected to an electrode of the light emitting element and a second land electrically connected to an electrode of the light receiving element;
a resist arranged as a layer above the electrically conductive pattern or the substrate; and
a light shielding layer provided as a layer above the resist,
wherein, in the direction of the normal of a mounting surface of the substrate, a portion of the first land and a portion of the light shielding layer are overlapped and a portion of the second land and a portion of the light shielding layer are overlapped, and
wherein, when viewed in the direction of the normal of the mounting surface of the substrate, there is a region surrounding the light emitting element without the light shielding layer.

16. A sheet conveyance apparatus comprising:
a conveyance roller that conveys a sheet along a conveyance path; and
an optical sensor configured to detect the sheet conveyed by the conveyance roller, wherein the optical sensor includes:
a light emitting element that emits and outputs light;
a light receiving element that receives light outputted from the light emitting element and reflected by an object to be irradiated;
a substrate on which the light emitting element and the light receiving element are mounted;
an electrically conductive pattern including a land electrically connected to an electrode of the light emitting element and formed on the substrate;
a resist arranged as a layer above the electrically conductive pattern or the substrate;
a light shielding layer provided as a layer above the resist; and
a light shielding region formed by a portion of the land and a portion of the light shielding layer overlapping in the direction of the normal of a mounting surface of the substrate, the light shielding region thereby configured to shield stray light directed towards the substrate from the light emitting element,
wherein, when viewed in the direction of the normal of the mounting surface of the substrate, there is a region surrounding the light emitting element without the light shielding layer.

17. An image forming apparatus comprising:
a conveyance roller that conveys a sheet along a conveyance path;
an optical sensor configured to detect the sheet conveyed by the conveyance roller; and
an image former that forms an image on the sheet, wherein the optical sensor includes:
a light emitting element that emits and outputs light;
a light receiving element that receives light outputted from the light emitting element and reflected by an object to be irradiated;
a substrate on which the light emitting element and the light receiving element are mounted;
an electrically conductive pattern including a land to be electrically connected to an electrode of the light emitting element and formed on the substrate;
a resist arranged as a layer above the electrically conductive pattern or the substrate;
a light shielding layer provided as a layer above the resist; and
a light shielding region formed by a portion of the land and a portion of the light shielding layer overlapping in the direction of the normal of a mounting surface of the substrate, the light shielding region thereby configured to shield stray light directed towards the substrate from the light emitting element,
wherein, when viewed in the direction of the normal of the mounting surface of the substrate, there is a region surrounding the light emitting element without the light shielding layer.

18. The image forming apparatus according to claim 17, wherein the optical sensor comprises at least one of:
- a sheet sensor configured to detect passing of the sheet conveyed by the conveyance roller;
- a media sensor configured to detect a surface state of the sheet;
- a density sensor configured to detect an optical density of the image formed on the sheet; and
- a color sensor configured to detect a tone of the image formed on the sheet.

\* \* \* \* \*